ANTON PFEUFFER, INVENTOR 3,039,655
APPARATUS TO CHARGE AN EARTH FILTER IN
A PIPELINE CARRYING A FLUID
Anton Pfeuffer, 790 Riverside Drive, Apt. 7G,
New York, N.Y.
Filed Nov. 8, 1956, Ser. No. 621,107
6 Claims. (Cl. 222—133)

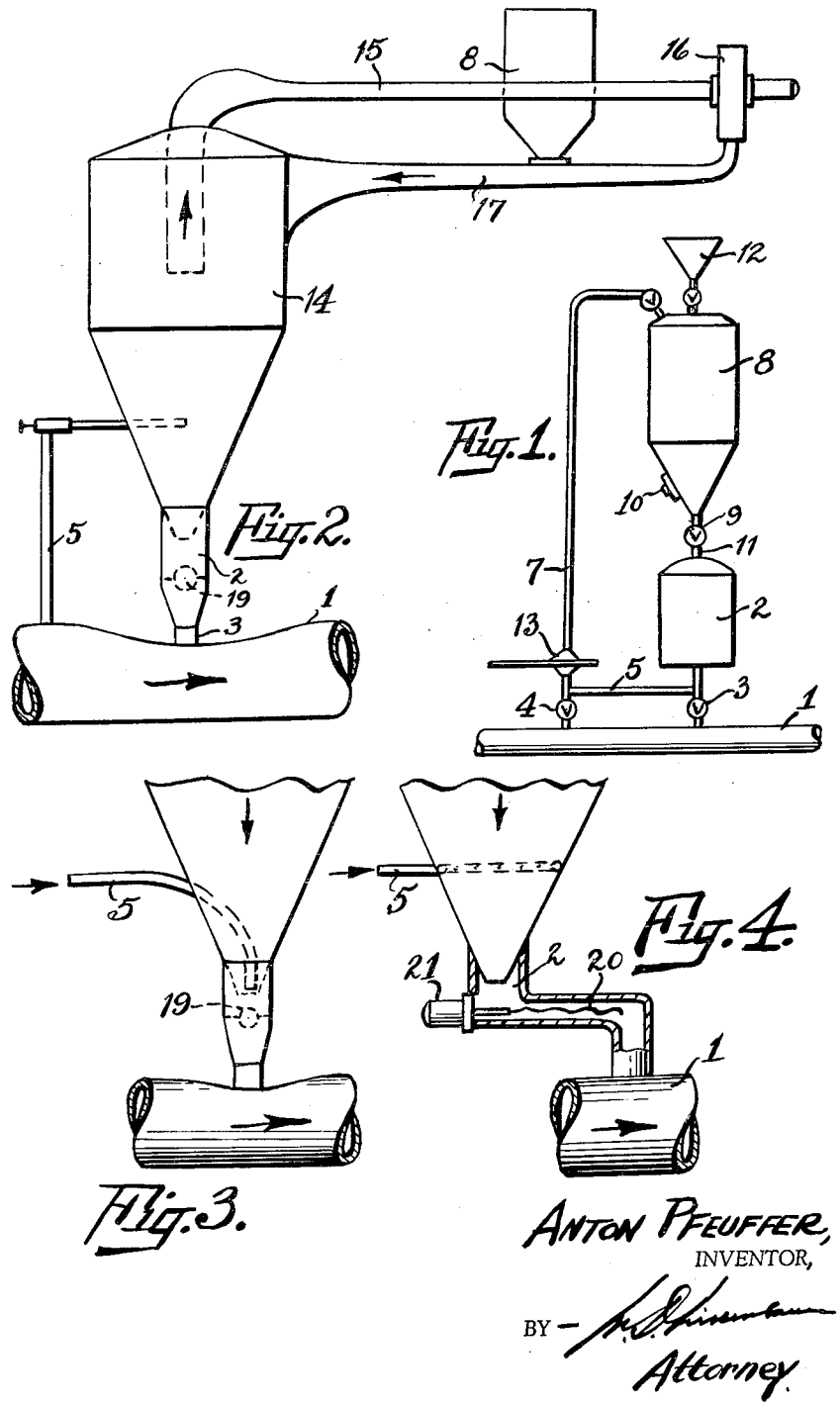

The present invention relates to an apparatus to charge an earth filter in a pipeline carrying a fluid, as for instance in a beer pipeline.

An object of this invention is to provide a novel and improved apparatus of the character mentioned, whereby infusorial earth or the like, in measured amount, is mixed with the flowing fluid and thereby brought to the filter means; the operation being continuous and automatic.

A further object thereof is to provide a novel and improved apparatus of the nature set forth, whereby the quantity of infiltration is controlled by the pressure existing in the flow line.

Another object thereof is to provide a novel and improved apparatus of the class described, wherein the earth is mixed with and carried by a gaseous medium under pressure into a mixing chamber for intermingling with the fluid supply and affording means for automatically equalizing the pressure of such gaseous medium with the pressure in the fluid line to conform earth supply to fluid flow.

A further object thereof is that the apparatus described shall effect thorough mixing of the earth with its gaseous carrier and then to effectively mix such earth with the fluid flow in the pipeline leading to the filter means.

Another object thereof is to provide automatic shut-off of the flow from the pipe line into the mixing chamber upon an undue increase of pressure in said pipe, in order to avoid the fluid from entering the wind chamber where the earth is dispersed in the gaseous carrier by a cyclonic movement of such gas.

A further object thereof is to provide automatic shut off of the earth particles into the mixing chamber upon decrease of pressure in the fluid flow line so as to avoid clogging the filter means.

A further object is to provide a controlled return of liquid from the mixing chamber back into the main flow line.

A further object thereof is to provide means whereby the operation within the mixing chamber may be observed so that corrective adjustments may be made if necessary.

Still a further object thereof is to provide novel and improved apparatus for the practice of the process taught herein, which is simple in structure, easy to understand, adjust and control, reasonably cheap to manufacture and efficient in carrying out the purposes for which it is designed.

Other objects and advantages will become apparent as this disclosure proceeds.

The process herein concerned with, comprises essentially the mixing of preferably measured amounts of infusorial earth or the like, with a gaseous medium flowing under pressure, then leading this charged gaseous carrier into a mixing chamber where it meets liquid from the flow line which enters the mixing chamber through a by pass. The liquid portion thus infiltrated, reenters the main line and thence the filter means where the carried earth particles are deposited to serve in filter action.

For the practice of such process, one form of apparatus therefor, may comprise a mixing chamber interposed in a by-pass of the main flow line or in a manner to receive liquid from such by-pass branch. This mixing chamber is directly above and preferably adjacent to the main pipeline so that the pressure in such pipeline will cause the liquid to rise to a certain level in the mixing chamber. Also, there is a source of earth supply which is sprinkled in measured amounts or by controlled flow into a bin which discharges into the upper end of the mixing chamber. A supply of gaseous medium as air or carbon dioxide under pressure, is led into such bin to effect cyclonic currents and thus thoroughly have dispersed the earth particles therein. In such dispersed condition, the particles are made to enter the mixing chamber where the earth particles infiltrate the fluid flow and thence carried to the filter means interposed in the main pipe line. The gas may be returned to a pump means to accomplish a circuitous existence.

The return from the mixing chamber to the main pipe line may be provided with means to control the return flow from the mixing chamber. Such may be done for instance by a screw blade made rotary and its speed controlled for accelerating or for retarding the flow back to the main line. A valve means may be included which is automatically responsive to the pressure existing in the main line to control the gas supply of such medium and thus automatically equalize the pressure of the gas in the mixing chamber with the pressure of the fluid flow in the main line.

Instead of a by-pass, the mixing chamber may be in a branch of the main line and fluid from the main line flow be brought into the mixing chamber in various ways to effect optimum mixing with the earth particles brought to said mixing chamber. Further, to observe operation, a part of the wall of the mixing chamber may be made transparent for such purpose. A detailed description and other incidents of structure and operation will now be set forth.

In the accompanying drawings forming part of this specification, similar characters of reference indicate corresponding parts in all the views.

FIG. 1 shows one form of apparatus embodying the teachings of this invention for carrying out the process set forth herein.

FIG. 2 is a modification thereof.

FIGS. 3 and 4 are fragmentary views showing part of the apparatus set forth in FIG. 2, but of slightly modified form respectively.

Figure 5:
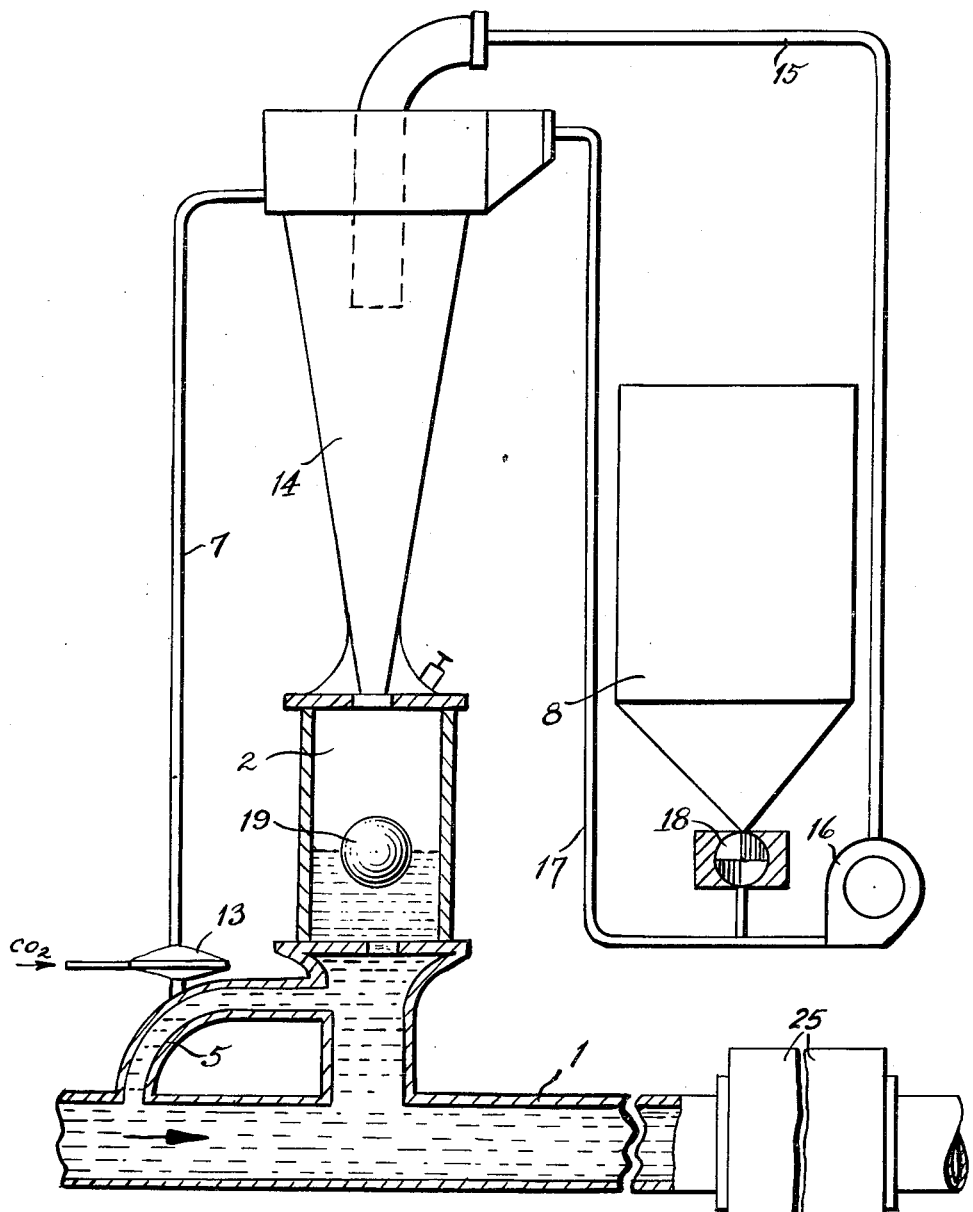
FIG. 5 is another modification of the apparatus.

In the drawings, one form of apparatus to treat the fluid flowing through the main pipe line 1 to a filter means 25 is illustrated in FIG. 1 wherein the numeral 2 designates a mixing chamber which receives a part of the main line flow through a branch or by-pass from said main line. The flow from such mixing chamber is controlled by a valve 3, while the intake into such mixing chamber is controlled by a valve 4 interposed at the termini of said by-pass respectively. A branch from said by-pass 5 leads to a pressure gas supply valve 13; such valve being responsive to the pressure existing in the main line and acts on change of the main line pressure, to change the gas supply and hence the pressure of such supply entering at the top of a bin 8 which received a controlled or measured supply of infusorial earth or the like from a valve-controlled funnel 12. The pressure gas entering the bin 8, sets up a cyclonic wind which because of its circulatory movement becomes thoroughly mixed with the earth particles which are sprinkled into the bin 8. This earth dust laden wind enters the mixing chamber 2 where it is mixed with the liquid flowing in the said mixing chamber and hence through the valve 3, is carried back into the main pipeline 1 and thence to the filter. The discharge from the bin 8 into the mixing chamber may be controlled by a valve 9 which is in connection with the mixing chamber by means of the coupling 11.

It is advisable to have the wall of the bin 8 subjected to a shaking action to shift any earth particles settled thereon. For such purpose there is the vibrator 10 or other suitable agitating means in place thereof.

The valve 13 is regulated to have proper pressure gas supply for feeding the earth particles into the mixing chamber during the continuance of normal pressure in the main line 1. As explained, upon increase of pressure in the main line flow, gas supply and hence its resulting pressure through pipe 7 and in the wind chamber or bin 8 and thence into the mixing chamber 2 will always regulate itself to make the pressure of the said earth-carrying gas in the mixing chamber to equalize itself to the pressure of the flow of liquid from the main line through the said mixing chamber 2. This action continues automatically and of course earth supply to funnel 12 needs to be replenished from time to time.

It is evident that with the apparatus shown in FIG. 1, a wind is created and it becomes mixed with a measured supply of earth particles which is then imposed upon and becomes mixed with the fluid running through the main line to the filter means and that the pressure of the main line flow controls the gas pressure and automatically causes it to become equalized to such main line pressure.

In the apparatus shown in FIG. 2, liquid flow from the main line is directed through the branch 5 into the lower portion of the wind bin 14 and thence into the mixing chamber 2 which is also a branch in the main line 1. This construction makes branch 5 and the return branch which is the mixing chamber 2, together, to constitute a by-pass of the main line 1. The gaseous carrier for the earth particles fed from a supply bin 8, is fed under pressure by a pump 16 through the discharge pipe line 17 and thence into the bin 14 where it enters preferably tangentially of the wall of said bin 14 in order to cause a circulatory motion producing a cyclonic wind within 14 wherein the dust particles carried along by the flow through pipe 17, become thoroughly mixed with the air pumped. The earth particles fall into the mixing chamber for dispersion into the main line flow, while the pumped gas or air returns to pipe 15 to the pump 16. It is to be noted that the intake of the said return pipe 15 is at a mid-interior point of the bin 14, so done by being in the form of a nozzle extending into such bin, but instead of discharging, it receives. The pump 16 is operated so that gas pressure in the mixing chamber 2 shall equal normal operating pressure of the flow in the main line. Any change in main line pressure will of course need an adjustment of pump action, and such change may be observed if part of the wall of the mixing chamber is transparent and the operator observing the level of liquid in such mixing chamber, may make the necessary change in motor speed until such level is re-established.

In FIG. 2, in order to equalize the pressures at both branches, meaning at 5 and the mixing chamber, the cross-sectional area of the main line 1 is made smaller at its connection to the outlet of the mixing chamber 2. This is done, in order not to have too low a water or beer level line in the mixing chamber, so that it could be observed even when the main pipe line pressure may become reduced. Although a float 19 is here shown, its function as a valve will be explained when the description is given of FIG. 5.

While in FIG. 2, admission of liquid to the mixing chamber 2 is within the wind bin 14, the embodiment illustrated in FIG. 3 shows such entrance at the discharge mouth of said bin 14 so as to assure the carrying along by washing down any settled earth particles. In the showing of FIG. 4, entrance is substantially as in FIG. 2, with the added provision that the liquid enter in spray form to better mix with the earth particles falling through the bin 14. Here too, provision is made in the return branch of the by-pass of a rotary screw conveyor blade 20 operated by motor 21, and its function is to control the return flow of the earth charged liquid back into the main pipe line 1. The speed of this motor of course can be controlled to accelerate or retard such return flow and further serves to thoroughly mix the liquid and the earth particles therein.

The apparatus embodiment shown in FIG. 5, is comprised essentially of the pressure gas pumping system employed in FIG. 2 and includes the pressure gas supply controlled by the valve 13 which is responsive to the pressure existing in the main fluid flow in pipeline 1. This embodiment therefore presents all the advantages of both the apparatus shown in FIGS. 1 and 2, which have been explained. FIG. 5 shows a constantly driven measuring valve 18 controlling the amount of earth particles carried along to the mixing chamber and this embodiment also shows that float 19 within the mixing chamber 2 acts as a valve to automatically shut off the chamber 14 so that the risen water level shall not go into the wind chamber when the pressure in the main pipe line 1 unduly rises and to automatically shut off the earth particles from entering the main line 1, when the pressure unduly falls in the main line as is occasioned by a failure of liquid supply therefor. Track means to guide the float 19 in a single vertical path is not shown to attain clarity of illustration, but is easily understood by those versed in the art. Of course, this valve feature and the use of the measuring valve 18, may be employed in all the other embodiments of structure shown, and such shall be deemed so included without further illustration.

This invention is capable of numerous forms and various applications without departing from the essential features herein disclosed. It is therefore intended and desired that the embodiments shown herein shall be deemed illustrative and not restrictive and that the patent shall cover all patentable novelty herein set forth; reference being had to the following claims rather than to the specific description herein to indicate the scope of this invention.

I claim:

1. In an apparatus for charging an earth filter in a pipeline carrying a fluid flowing under pressure therethrough, a chamber communicative with the pipeline at a region the fluid passes before it reaches the filter, means to introduce a dry gaseous medium under pressure into said chamber, tangentially to a wall of said chamber whereby the gaseous medium assumes a cyclonic movement within the chamber, means to introduce earth particles into said gas, means operated by the pressure of the fluid in the pipeline to control the supply of gas under pressure in said chamber; said chamber having an exit, a mixing chamber interposed communicatively with and between said exit and the pipeline; said mixing chamber being so positioned that it extends above the pipeline and so that the fluid from the pipeline shall come into it up to a predetermined level below said exit during the continuance of normal operating pressure of the fluid in the pipeline and an element which can float in said fluid, positioned within said mixing chamber and adapted upon a predetermined rise in fluid level in said mixing chamber, to close said exit.

2. The apparatus as defined in claim 1, wherein the means operated by the pipeline pressure is a pressure responsive valve means arranged to be responsive to the pressure of the fluid in the pipeline, said valve means operating to control the supply of gaseous medium into the chamber whereby the pressure of said gas in said chamber is equalized to the pressure of the fluid in the pipeline.

3. The apparatus as defined in claim 2, wherein the gaseous medium is supplied to the chamber by a piping system including a pump; said piping system having an intake end and a discharge end; both such ends being communicatively connected with said chamber whereby upon operation of said pump a wind is caused within said chamber and a bin for holding earth particles, discharging into said piping system at a region intermediate the pump and one of the ends of such piping system.

4. The apparatus as defined in claim 1, wherein the gaseous medium is supplied to the chamber by a piping system including a pump; said piping system having an intake and a discharge end; both such ends being communicatively connected with said chamber whereby upon operation of said pump a wind is caused within said chamber and a bin for holding earth particles, discharging into said piping system at a region intermediate the pump and the discharge end of such piping system.

5. The apparatus as defined in claim 1, wherein the pipeline has a branch which serves as the communicative connection thereof with the discharge end of the mixing chamber and a second branch from the pipe line, so connected that said second branch will discharge into liquid which has risen from the pipeline; the first branch being nearer to the filter position than is the second branch.

6. The apparatus as defined in claim 5, wherein the discharge end of the second branch is communicative with the first branch at substantially the place where the discharge from the said mixing chamber enters the first branch.

References Cited in the file of this patent

UNITED STATES PATENTS

| | | |
|---|---|---|
| 2,195,616 | Chesson | Apr. 2, 1940 |
| 2,455,130 | Lomax | Nov. 30, 1948 |
| 2,631,969 | Klueger | Mar. 17, 1953 |
| 2,653,802 | Bauerlein | Sept. 29, 1953 |
| 2,823,833 | Bauerlein | Feb. 18, 1958 |

FOREIGN PATENTS

| | | |
|---|---|---|
| 830,778 | Germany | Feb. 7, 1952 |
| 926,417 | Germany | Apr. 18, 1955 |
| 1,039,489 | France | May 13, 1953 |
| 1,039,490 | France | May 13, 1953 |